Nov. 6, 1962

G. STARRE 3,062,975

ELECTRIC MOTOR

Filed Nov. 16, 1959

INVENTOR
G. STARRE

BY
Frank R. Infani
AGENT

Nov. 6, 1962  G. STARRE  3,062,975
ELECTRIC MOTOR

Filed Nov. 16, 1959  2 Sheets—Sheet 2

INVENTOR
G. STARRE

United States Patent Office 3,062,975
Patented Nov. 6, 1962

3,062,975
ELECTRIC MOTOR
Gerrit Starre, Drachten, Netherlands, assignor to North American Philips Company, Inc., New York, N.Y., a corporation of Delaware
Filed Nov. 16, 1959, Ser. No. 853,087
Claims priority, application Netherlands Dec. 15, 1958
4 Claims. (Cl. 310—50)

The invention relates to an electric motor and has for its object to provide such a construction thereof that both the number of components parts and the fastening material required for holding these parts together are minimized, while a satisfactory centering is ensured.

In accordance with the invention this is achieved by supporting the rotor part of the motor from a frame consisting of two halves, which are held clamped together by the stator part.

In accordance with the invention the two frame halves, preferably made of insulating material, have preferably exactly the same shape and dimensions and are arranged symmetrically with respect to the axial plane at right angles to the contact surface of the two halves so that these halves can be manufactured with the aid of one and the same mould.

A further explanation follows with reference to one embodiment shown in the drawing in which, FIGS. 1, 2, 3 and 4 are a plan view, a side view, a front view and a rear view respectively.

Figure 1:
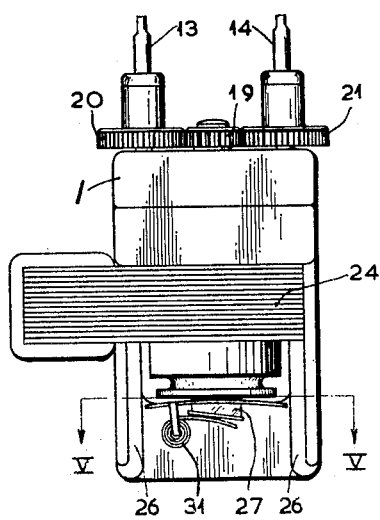
Figure 2:
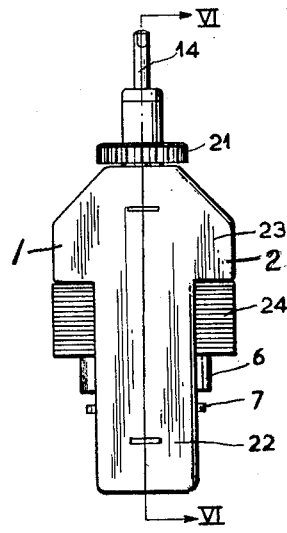

In the embodiment shown the motor frame consists of two identical halves 1, 2 of insulating material which can be readily moulded, for example from resin. The shape of each of these halves is clearly shown by FIG. 8. When the two halves are pressed to each other with their flat sides, the pins or locating members 3 of one half fall into the cavities or receiving portions 4 of the other half, so that a relative, lateral displacement of the parts is avoided.

The parts 1, 2 have each a rectangular, central aperture 5, inside of which the rotor 6 with its commutator 7 is arranged. They are furthermore provided on each side with transverse cavities 8 and 9 respectively, which serve to accommodate the two spherical shaft bearings 10, while the cavity 9 accommodates, moreover the bearings 11, 12 or two load shafts 13 and 14 respectively driven by the rotor shaft. One spherical bearing 10 is held centrally in the cavity 8 by a plate 15, which fits in grooves 16 of the frame, whereas the other spherical bearings, together with the bearings for the shafts 13 and 14, is held centrally in the cavity 9 by a plate 17, fitting in grooves 18 of the frame.

At the end of the rotor shaft projecting from the frame is provided a gear pinion 19, which co-operation with gear wheels 20 and 21, which are seated on the load shafts 13 and 14 respectively.

As soon as the parts so far described are positioned in one of the two frame halves, the second frame half can be laid on the first half, so that the said parts are fixed in their correct relative positions.

Figure 3:
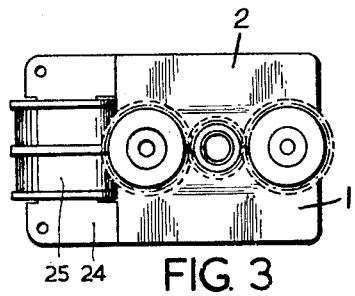
Figure 4:
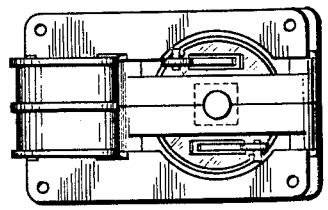
Figure 8:
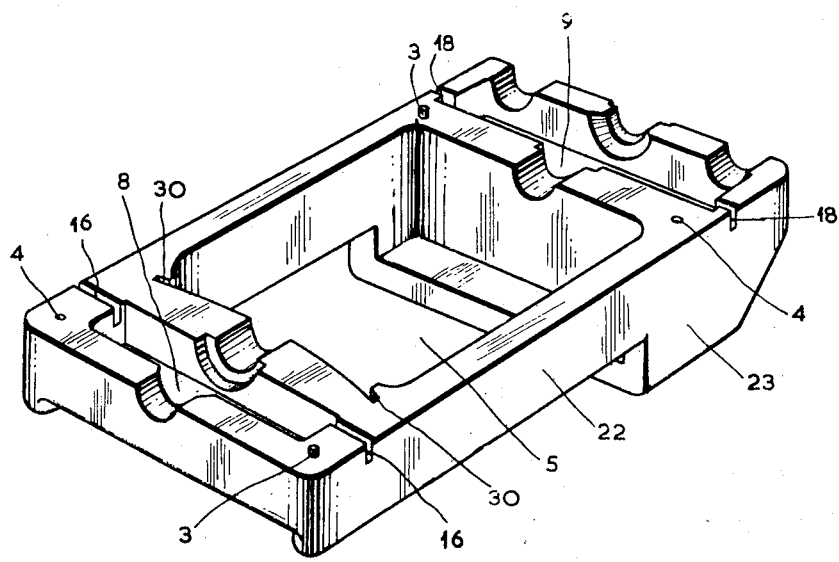
FIG. 8 is a perspective view of one of the frame halves, on an enlarged scale.

The two frame halves 1, 2 are then clamped to each other by means of the stator part by slipping the latter on the assembled narrow parts 22 of the frame up to the widened part 23 (FIGS. 3 and 8).

The stator part consisting of an iron core 24 and a field winding provided thereon slides in grooves 26 (FIG. 1) on the outer sides of the frame halves and holds the latter together by spring pressure, while the stator itself is prevented from sliding back along the grooves by friction.

Figure 5:
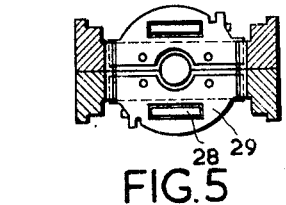
FIG. 5 is a cross section taken on the line V—V of FIG. 1.
Figure 7:
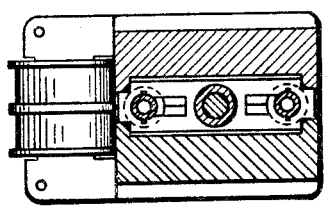
FIG. 7 is a cross section taken on the line VII—VII of FIG. 6.
Figure 6:
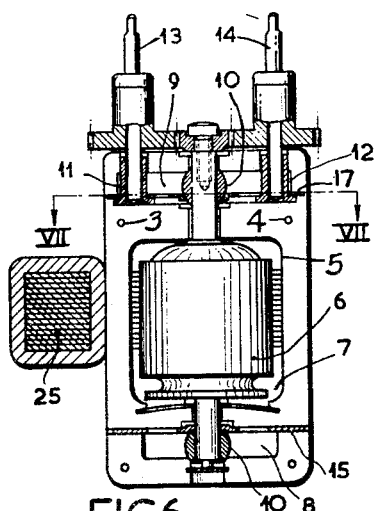
FIG. 6 is a cross section taken on the line VI—VI of FIG. 2.

The brushes 27, of which one is shown in FIG. 1, are guided through rectangular slots 28 in two semi-circular plates 29 (FIG. 5), which are positioned from the outside, into grooves 30 and fixed subsequently by bending over a pair of tags around lugs (not shown in the drawing) of the frame halves. To each of these plates 29 is secured a spring contact 31, which bears on the brush concerned and holds it pressed against the commutator 7. By these spring contacts, in this case the plates 29, the desired electrical connections can be established with the rotor.

Owing to the symmetrical arrangement of the pins 3 and cavities 4 with respect to the axial plane at right angles to the contact surface of the two frame halves the latter can be moulded by means of the same mould, so that an absolute identity is ensured. Since a posterior adjustment of the parts, when the motor has once been assembled, is no longer possible, this identity constitutes an absolute condition to obtain satisfactory results.

The total number of parts is small with respect to that of known constructions, being for example about 30, while only one screw connection is required, i.e. to secure the gear pinion 19 on the rotor shaft.

What I claim is:

1. An electric motor construction comprising a rotor and a stator, a housing constituting two substantially identical, complementary halves forming cavities supporting said rotor, each half being provided with a locating member extending from the contact surface of the respective half of the housing and a complementary receiving portion for said locating member in the other half of the housing, and with the same number of cavities located laterally and symmetrically to said locating member on the contact surface, said stator embracing external surfaces of said housing holding together said two halves with said rotor therein.

2. An electric motor construction comprising a rotor and a stator, a housing constituting two substantially identical, complementary halves forming cavities supporting said rotor, each half being provided with a locating member extending from the contact surface of the respective half of the housing and a complementary receiving portion for said locating member in the other half of the housing, and with the same number of cavities located laterally and symmetrically to said locating member on the contact surface, said stator embracing external surfaces of said housing holding together said two halves with said rotor therein and additional cavities having spring-urged bearings and transmission elements housed therein.

3. An electric motor as claimed in claim 1 wherein said rotor is centrally located in the bore of said stator due to the symmetry of the complementary halves of said housing.

4. An electric motor as claimed in claim 2 further comprising grooves in said housing and elements inserted in said grooves for rigidly holding said bearings in said housing.

References Cited in the file of this patent

UNITED STATES PATENTS

| | | |
|---|---|---|
| 735,848 | Waring | Aug. 11, 1903 |
| 1,525,826 | Perlman | Feb. 10, 1925 |
| 1,540,038 | Spielman | June 2, 1925 |
| 2,752,517 | Von Delden | June 26, 1956 |

FOREIGN PATENTS

| | | |
|---|---|---|
| 696,878 | Germany | Oct. 1, 1940 |